United States Patent [19]

Kumomura

[11] Patent Number: 5,850,219
[45] Date of Patent: Dec. 15, 1998

[54] METHOD AND SYSTEM FOR ELECTRONIC DOCUMENT APPROVAL WITH DISPLAYED IMPRINT

[75] Inventor: Akira Kumomura, Kawasaki, Japan

[73] Assignee: Hitachi, Ltd., Tokyo, Japan

[21] Appl. No.: 717,181

[22] Filed: Sep. 20, 1996

[30] Foreign Application Priority Data

Sep. 20, 1995 [JP] Japan ................................. 07-241321

[51] Int. Cl.⁶ ........................................................ G06F 3/00
[52] U.S. Cl. ........................... 345/331; 345/349; 707/511; 705/1
[58] Field of Search .................... 364/400; 345/326–358, 345/961; 707/511, 500, 530; 705/7, 12, 1; 395/200.3, 200.37

[56] References Cited

U.S. PATENT DOCUMENTS

| 5,040,142 | 8/1991 | Mori et al. | 707/511 |
| 5,315,504 | 5/1994 | Lemble | 364/400 |
| 5,627,764 | 5/1997 | Schutzman et al. | 395/200.37 |

*Primary Examiner*—John E. Breene
*Attorney, Agent, or Firm*—Antonelli, Terry, Stout & Kraus, LLP

[57] ABSTRACT

An electronic approval method and system for determining an electronic mail to be approved from received pieces of electronic mail, efficiently performing electronic approval on a selected piece of electronic mail, and efficiently sending the processed pieces of electronic mail back to its sender if not approved or to the next approving person if approved. Pieces of electronic mail are received and classified by types according to various categories such as mail for approval, mail for return/forwarding, mail for reference (peruse), and unread/already read mail others as necessary. From the received pieces of electronic mail, a piece of electronic mail to be approved is selected and displayed on a display device. An electronic approval column of the displayed piece of electronic mail is registered with an approval seal of the previous approving person. In an electronic approval column of the current approving person who has received the mail, an imprint of the current approving person blinks to indicate the location the approval seal of the current approving person is to be disposed. If the current approving person does not approve the mail, clicks the approval column of the previous approving person to send the mail back to the sender. If the current approving person approves the mail, the current approving person registers their approval seal and clicks an imprint of a next approving person which may be a superior, another section or other such destination to forward the mail.

52 Claims, 8 Drawing Sheets

<ELECTRONIC MAIL NOTIFICATION>

| DIVISION | FOR APPROVAL | FOR RETURN/ FORWARDING | FOR REFERENCE (PERUSE) |
|---|---|---|---|
| UNREAD | 2 | 5 | 2 |
| ALREADY READ | 3 | 2 | 4 |

31        [ OK ]   [ CANCEL ]

FIG. 3B

| NO | CONTENTS | FOR APPROVAL | FOR RETURN/ FORWARDING | FOR REFERENCE (PERUSE) | FOR UNREAD/ ALREADY READ |
|---|---|---|---|---|---|
| 1 | INSURANCE MONEY PAYMENT EXAMINATION SHEET | 1 | 0 | 0 | 0 |
| 2 | WEEKLY INSURANCE CONTRACT REPORT | 0 | 1 | 0 | 1 |
| 3 | INSURANCE BUSINESS | 0 | 0 | 1 | 1 |
| : | : | : | : | : | : |

APPROVAL STATUS TABLE

| DIVISION | APPROVAL HISTORY | FIRST APPROVAL COLUMN | SECOND APPROVAL COLUMN |
|---|---|---|---|
| PREPARATION | 1 | 1 | 1 |
| EXAMINATION | 0 | 0 | 0 |
| APPROVAL | 0 | 0 | 0 |

FIG. 4B

|  | Approved by: | Examined by: | Prepared by: |
|---|---|---|---|
|  | Suzuki | Yamada | Tanaka |

INSURANCE MONEY PAYMENT EXAMINATION SHEET

----------------------------------------
----------------------------------------
----------------------------------------

RESULTS OF CERTIFICATES EXAMINATION
                :NO PROBLEM

AGGREGATE AMOUNT OF INSURANCE MONEY
PAYMENT            :1.2 MILLION YEN

NUMBER OF TIMES INSURANCE MONEY PAYMENT
CLAIMED                                :

AMOUNT OF INSURANCE MONEY PAYMENT
CLAIMED THIS TIME        :10 MILLION YEN

| Examined by: | Prepared by: |
|---|---|
| Yamada | Tanaka |

FIG. 5A

APPROVAL COLUMN TABLE

| ELECTRONIC MAIL RECEIVE POINTER | APPROVING PERSON | APPROVAL | EXAMINATION | PREPARATION |
|---|---|---|---|---|
| 0 | TANAKA | 0 | 0 | 1 |
| 1 | YAMADA | 0 | 1 | 0 |
| 0 | SUZUKI | 1 | 0 | 0 |

FIG. 5B

APPROVAL SEAL DISPLAY FORM TABLE

| DISPLAY FORM OF ELECTRONIC APPROVAL SEAL | APPROVED PERSON | IN-PROCESS | TO BE APPROVED |
|---|---|---|---|
| SOLID LINES | 1 | 0 | 0 |
| BLINKING | 0 | 1 | 0 |
| DOTTED LINES | 0 | 0 | 1 |

FIG. 6A

APPROVAL STATUS TABLE

| DIVISION | APPROVAL HISTORY 41 | FIRST APPROVAL COLUMN 42 | SECOND APPROVAL COLUMN 43 |
|---|---|---|---|
| PREPARATION | 1 | 1 | 1 |
| EXAMINATION | 0 | 0 | 0 |
| APPROVAL | 0 | 0 | 0 |

FIG. 6B

| Approved by: | Examined by: 47 | Prepared by: 48 |
|---|---|---|
| Suzuki | Yamada | Tanaka |

~49

INSURANCE MONEY PAYMENT EXAMINATION SHEET

----------

RESULTS OF CERTIFICATES EXAMINATION
:NO PROBLEM

AGGREGATE AMOUNT OF INSURANCE MONEY
PAYMENT                :1.2 MILLION YEN

NUMBER OF TIMES INSURANCE MONEY PAYMENT
CLAIMED                                :

AMOUNT OF INSURANCE MONEY PAYMENT
CLAIMED THIS TIME        :10 MILLION YEN

50

| Examined by: | Prepared by: |
|---|---|
| Yamada | Tanaka |

FIG. 7A

APPROVAL STATUS TABLE

| DIVISION | APPROVAL HISTORY | FIRST APPROVAL COLUMN | SECOND APPROVAL COLUMN |
|---|---|---|---|
| PREPARATION | 1 | 1 | 1 |
| EXAMINATION | 0 | 0 | 0 |
| APPROVAL | 0 | 0 | 0 |

FIG. 7B

| Approved by: | Examined by: | Prepared by: |
|---|---|---|
| Suzuki | Yamada | Tanaka |

INSURANCE MONEY PAYMENT EXAMINATION SHEET

----------------------------------
----------------------------------
----------------------------------

RESULTS OF CERTIFICATES EXAMINATION
  :NO PROBLEM

AGGREGATE AMOUNT OF INSURANCE MONEY
PAYMENT          :1.2 MILLION YEN

NUMBER OF TIMES INSURANCE MONEY PAYMENT
CLAIMED                                :

AMOUNT OF INSURANCE MONEY PAYMENT
CLAIMED THIS TIME     :10 MILLION YEN

| Examined by: | Prepared by: |
|---|---|
| Yamada | Tanaka |

METHOD AND SYSTEM FOR ELECTRONIC DOCUMENT APPROVAL WITH DISPLAYED IMPRINT

BACKGROUND OF THE INVENTION

The present invention relates to an electronic approval method and an electronic approval system. More particularly, the present invention relates to an electronic approval method and an electronic approval system that can determine in a simple manner an electronic mail to be approved from among those received, perform electronic approval on selected electronic mail to be approved in an efficient manner, and send the approved electronic mail to a specified destination in an efficient manner.

A conventional method and a system for electronically approving documents received in the form of electronic mail and returning or forwarding the results in electronic mail are disclosed in "NIKKEI Strategy," July 1994, pp. 66–76 by way of example. In the described method and system, received pieces of electronic mail are stored in a mail box regardless of their types to be electronically approved later. Upon approval and when imprinting an electronic approval seal indicating approval on each of the pieces of electronic mail (documents), a graphic previously prepared must be disposed on a graphic area of a previously prepared electronic approval column of the electronic mail in order to compose a complete approval document. It is further necessary, when sending an approved piece of electronic mail, to close a screen used for approving electronic mail and open a screen used for sending electronic mail.

The above-described conventional method and system suffer from the following disadvantages.

In the conventional method and system of searching a mail box for a desired piece of electronic mail to be approved, there is no way of distinguishing between newly arrived electronic mail and electronic mail that has already arrived. Therefore, it is necessary to check a list of all the pieces of electronic mail in the mail box for a desired one, thereby lowering processing efficiency. Particularly, processing efficiency is lowered if a piece of electronic mail in the list does identify itself as requiring approval, an operator is required to open the mail to determine whether the mail is for approval or not.

In addition, in electronic approval, an electronic approval seal or signature needs to be prepared in graphic in advance and disposed or moved onto a previously framed electronic approval column of an electronic mail to indicate that the electronic mail has been approved. Thus, the load on the operator is further increased thereby lowering efficiency.

Further, after electronic approval, in order to send an electronic mail back to its source or forward it to an approving person, an electronic mail approving screen must be changed to an electronic mail sending screen to newly specify a desired destination every time such an operation takes place. Such an operation lowers processing efficiency even further.

SUMMARY OF THE INVENTION

It is therefore an object of the present invention to provide an electronic approval method and system for efficiently selecting electronic mail to be approved.

It is another object of the present invention to provide an electronic approval method and system for easily detecting a position at which an electronic approval seal is to be imprinted.

It is still another object of the present invention to provide an electronic approval method and system for efficiently sending an approved electronic mail back to its source or forwarding it to a desired destination.

In carrying out the invention and according to one aspect thereof, there is provided an electronic mail approval method and system for receiving an electronic mail, electronically approving the received electronic mail, and sending the approved electronic mail back to its source or forwarding it to a desired destination.

First, received pieces of electronic mail are stored by type into categories such as mail for approval, mail for return/forwarding, mail for reference (peruse), and other such categories. An approving person (an operator who has received the pieces of electronic mail) selects a piece of electronic mail to be approved from among the received pieces of electronic mail and displays the selected piece of electronic mail on a display device. The displayed mail is generally a document to be approved and has one or more approval columns. An approval seal is imprinted at a predetermined position on each approval column. It should be noted that the approval seal may be a stamp or a signature. The approval columns may be defined by a person who prepares that document. When an approving person receives an electronic mail, it may have an approval column imprinted with an approval seal by another (previous) approving person who has sent the mail to the current approving person. The imprinted approval seal is formed in solid lines in an image unique to each approving person.

A position at which the current approving person is to imprint his or her approving seal is shown with an imprint containing the current approving person's name in a highlighted manner. This imprint is for informing the current approving person of the position at which he or she is to imprint the approval seal. This imprint may be a simple one that circles the name.

The imprint may be highlighted in a variety of ways. For example, the imprint may be caused to blink, change to a color different from other portions of the document, heightened in luminance, or inverted. At the position at which the next approving person is to imprint his or her approval seal, its imprint is shown in a dim manner. This imprint may also be a simple one that circles the name. To indicate that this imprint shows that an approval seal has yet to be disposed thereon, the imprint may be distinguished from the already approved imprint by lower luminance, dotted lines, or dimmer hue for example. It should be noted that, if a document has two or more approval columns, all approval columns to be approved are displayed in the same manner.

Next, the current approving person determines whether the document is to be approved or not. If the document has been found to be approved, then the approving person clicks the imprint that is blinking for example with a pointer of a mouse for example, thereby providing the approval seal. If there are two or more approval columns, when one of them has been approved, the pointer automatically moves to another column, prompting its approval.

Upon completion of the approval including disapproval, the approving person clicks the approval seal, the imprint made by the previous approving person, in an approval column or clicks an imprint of the next approving person. Detecting this click, the terminal device sends the approved electronic mail to the person corresponding to the detected click. That is, if the electronic approval column of the pervious approving person is clicked, the mail is sent back to the previous approving person. If the electronic approval column of the next approving person is clicked, the mail is forwarded to the next approving person.

Thus, according to the present invention, the terminal device includes imprint display control apparatus for displaying an approved imprint and an imprint to be approved in approval columns respectively of an electronic mail being displayed, approval seal giving apparatus for detecting the designation of any of the above-mentioned imprints by a pointer to provide electronically an approval seal to the position of the designated imprint, and transmitting apparatus for detecting the designation of the imprint by the pointer to send the approved electronic mail to a person indicated by the designated imprint, thereby performing the electronic approval processing of the present invention.

The above-described processings can be implemented in software by installing a computer program written to perform the processings into a personal computer for example. The computer program may be stored on a floppy disk, a magneto-optical disc, memory device or other recording medium readable by the personal computer.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENT

This invention will be described in detail by way of example with reference to the figures.

Figure 1:
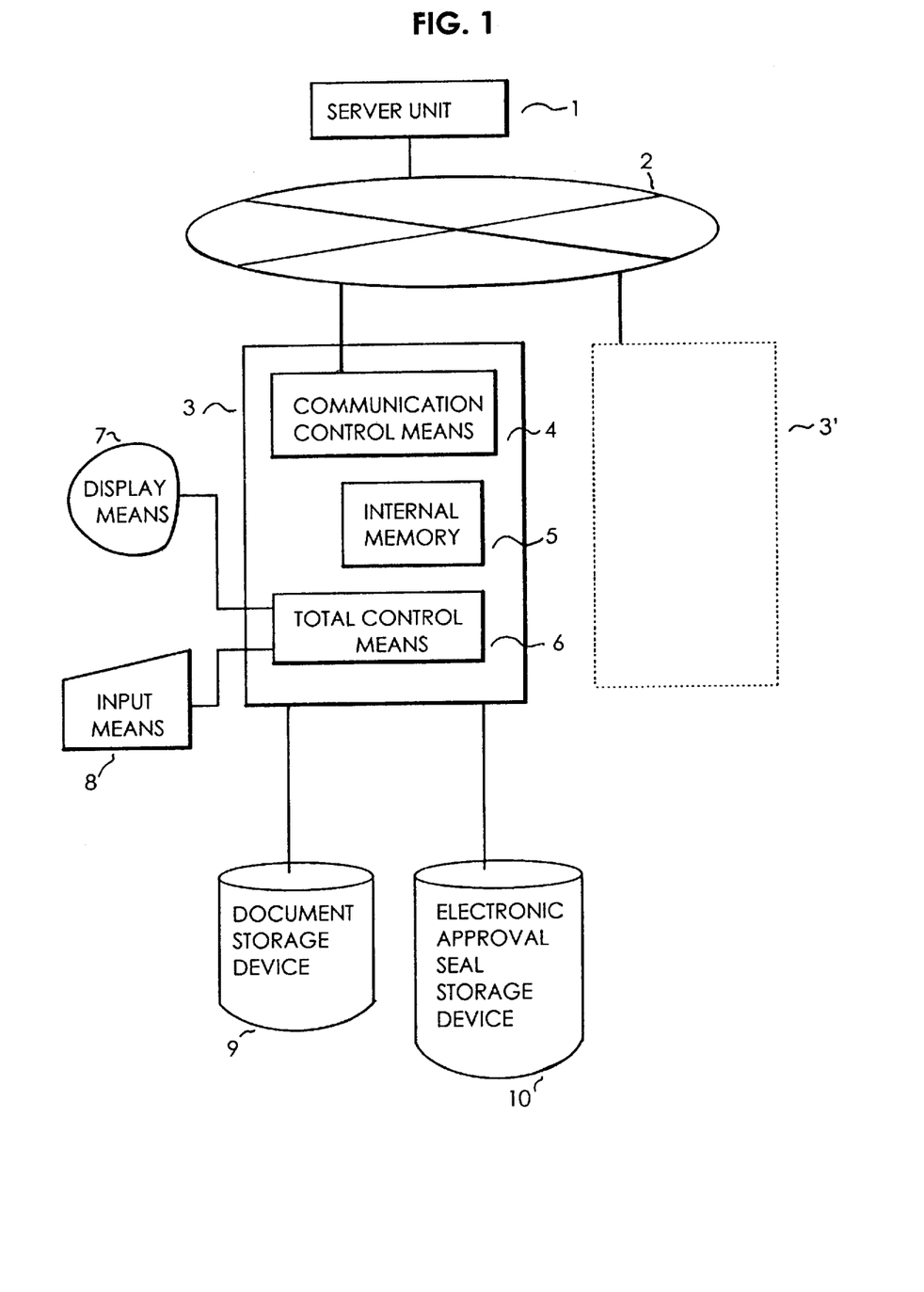
FIG. 1 is a schematic diagram illustrating the construction of a system of an embodiment of the present invention.

FIG. 1 illustrates a schematic diagram of the configuration of an electronic approval system practiced as one preferred embodiment of the present invention. A server unit 1 and a plurality of client units 3 and 3' are interconnected via a network 2. The client unit 3 is connected with a display device 7, an input device 8, and external storage including a document storage device 9 and an electronic approval seal storage device 10.

Each of the client units 3 and 3' forms a terminal device for use by each approving person. The client units in cooperation with the network 2 provides an electronic mail network that operates under the control of the server unit 1. The electronic mail network can be built by using known technologies. Therefore the details of such a network are not explained herein. The client unit 3 can be implemented by a personal computer for example, containing total control apparatus 6 which includes a CPU (not shown), an internal memory 5, and communication control apparatus 4 for controlling information transfer via the network.

The display device 7 is a device for visually displaying display information including image information of pieces of electronic mail received by the client unit. The display information is generated by the client unit 3 via the total control apparatus 6. The display device 7 can be implemented by a CRT or liquid crystal display.

In addition to entering text and graphics, the input device 8 is used to enter the selection of a piece of received electronic mail by type and the selection of electronic approval columns of the received piece of electronic mail by an approving person (or the operator of each client unit). For example, the input device 5 can be implemented by a mouse, a joy stick, or a keyboard. The document storage device 9 stores received pieces of electronic mail classified by type, and an approval status table and an approval column table (to be described below) attached to each piece of electronic mail. The electronic approval seal storage device 10 stores display forms (solid-line display, blink display or dotted-line display for example) to be used when displaying electronic seals.

The total control apparatus 6 controls the client unit 3 in its entirety by executing a program installed in the total control apparatus 6 in advance to perform required operations. To be specific, the total control apparatus 6 controls the displaying of electronic mail onto the display device 7 by type, the displaying of an electronic approval seal or an imprint indicating that approval is necessary in a corresponding electronic approval column in particular display forms (solid lines or blinking for example) onto the display device 7, and editing of the received electronic mail by type or the electronic approval seals in the corresponding display forms. It will be apparent that the above-mentioned processing operations can be performed in software by execution of the pre-installed program.

A flowchart of the processing performed by the client unit 3 via the total control apparatus 6 when the computer program is executed will be described with reference to FIG. 2. The other figures, namely FIGS. 3–7 can be referred to so as to show the various screens used during the processing and the format in which data is stored. Essentially, according to the processing, electronic mail is received by the client unit 3, necessary processing is performed on the received electronic mail, and the processed electronic mail is sent (or returned) to another (or previous) client unit.

Figure 2:
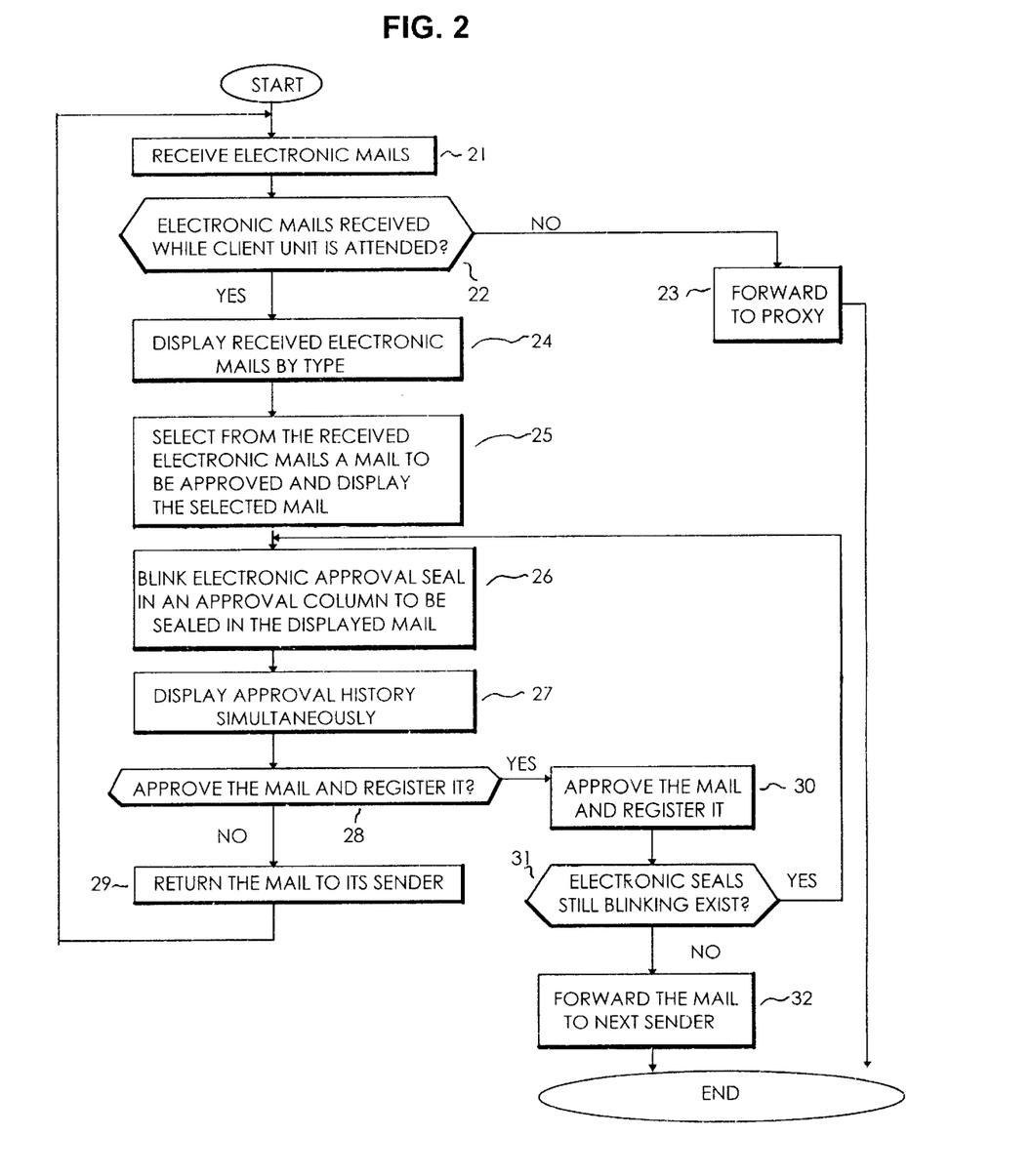
FIG. 2 is a flowchart of the computer program executed by the system of the embodiment of the present invention illustrated in FIG. 1.

Referring to FIG. 2, received pieces of electronic mail is captured in the document storage device 9 (step 21) and it is determined whether the captured mail has been received while the client unit 3 was attended by its operator (step 22). If the mail has been found to have been captured with the client unit 3 unattended or, even if the client unit 3 was attended, out of its expiration date, the received mail is forwarded to a proxy (step 23). The attendance of the operator is determined by the total control apparatus 6. The operator can specify whether he or she is in attendance or not. Alternatively, when a screen saver is operating, it can be used to indicate that the client unit 3 is not attended. It will also be apparent that, if the power to the client unit 3 is off, no mail can be transferred from the server unit 1 to the client unit 3, so that the impossibility of the transfer may be made known to indicate that the client unit 3 is unattended, causing the server unit 1 to instruct the transfer to a predetermined destination.

When pieces of electronic mail have been received and when the client unit 3 is attended, the received pieces of electronic mail are classified by type and information of the classifications are displayed on the display device 7 (step 24). The classification of the received pieces of electronic mail is performed by the total control apparatus 6 so as to be managed in the document storage device 9 in the form of a table as shown in FIG. 3B. In this table, the received pieces of electronic mail are classified into the categories of mail for approval, mail for return/forwarding, mail for reference (peruse) and unread/already read mail. For each piece of electronic mail a flag "1" is set in any of the columns corresponding to the categories to indicate that the piece of electronic mail is for approval, for return/forward, for reference (peruse) or is unread/already read. Based on the information contained in the table illustrated in FIG. 3B, the received pieces of electronic mail are displayed by type in a display screen (using a window) as shown in FIG. 3A.

Figure 3A:
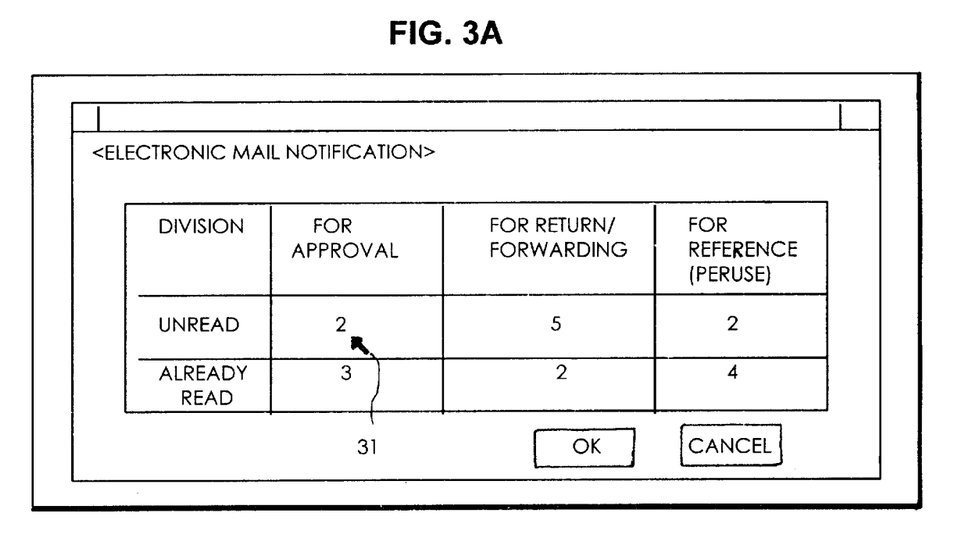
FIGS. 3A–3C illustrate a screen image in which the number of received pieces of electronic mail are shown by type, a screen image in which the received pieces of electronic mail of the same type are listed and a table of received pieces of electronic mail classified by type.
Figure 3B:
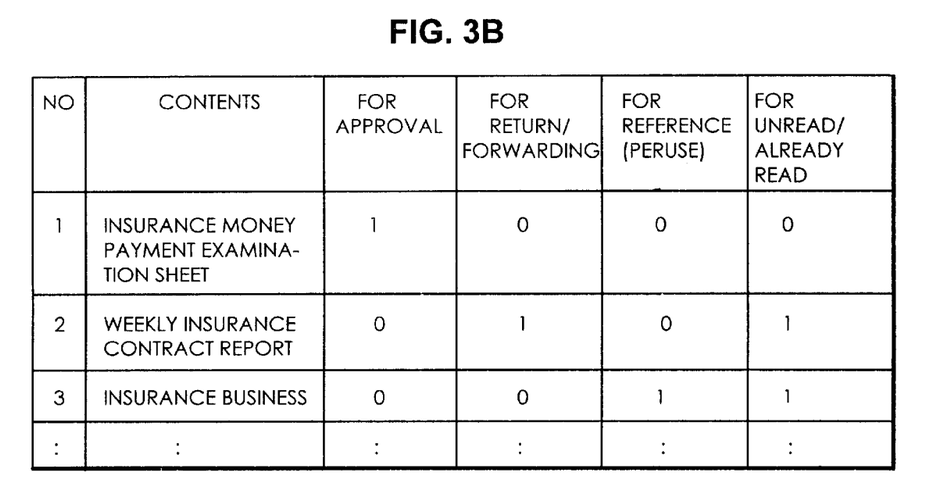
Figure 3C:
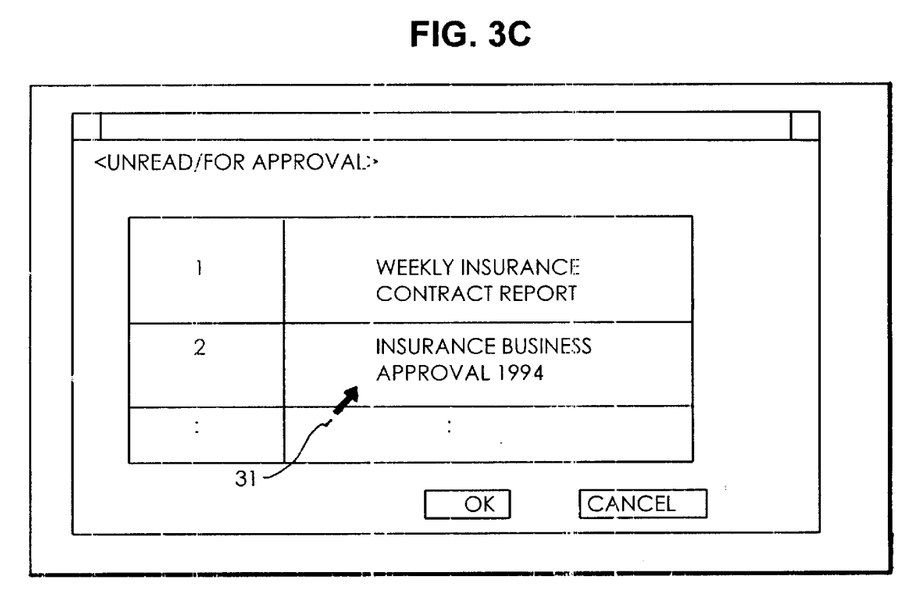

On the display screen illustrated in FIG. 3A, the number of received pieces of electronic mail is displayed by being divided into the for approval, for return/forward, for reference (peruse) and unread/already read categories. When the operator selects a category of pieces of electronic mail information to be approved or read by using a mouse pointer 31 a listing of the pieces of electronic mail associated with the selected category are displayed as illustrated in FIG. 3C (step 25). Thereafter a particular piece of electronic mail from the listing can be selected by using the mouse pointer 31. When the piece of electronic mail has been selected the image of the selected piece of electronic mail is displayed on the display device 7.

Figure 4A:
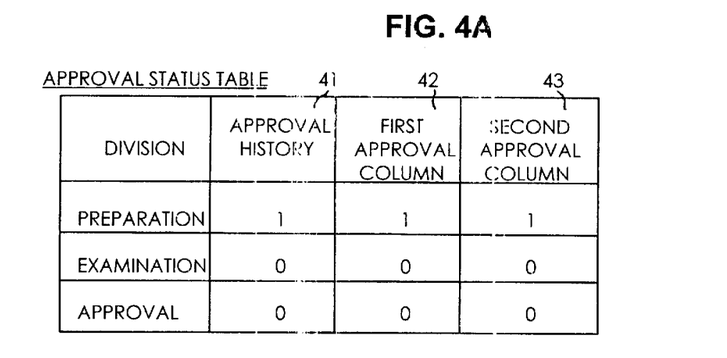
FIGS. 4A–4B illustrate an approval status table including the approval history before being approved and a display screen.
Figure 4B:
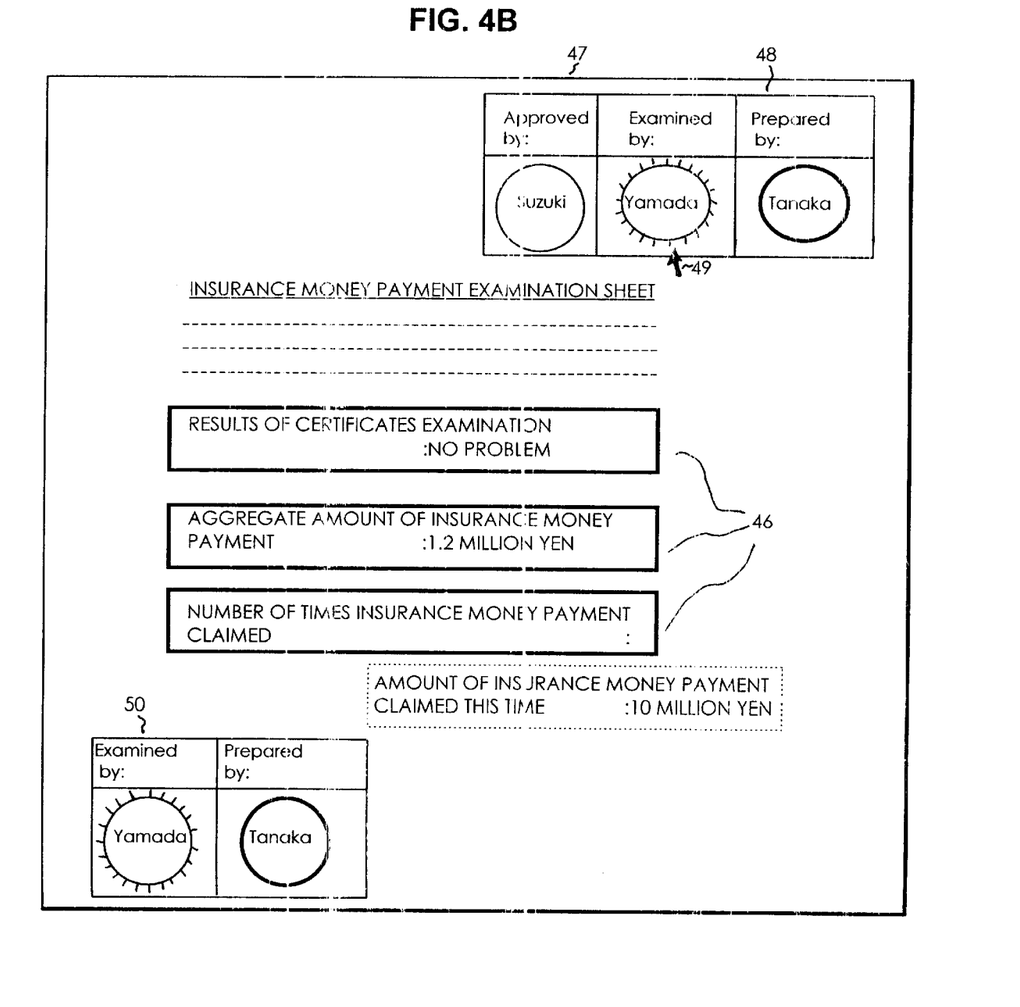

FIG. 4B shows an example of a form of a selected and actually displayed piece of electronic mail. This piece of electronic mail is an insurance money payment examination sheet 47. At the upper right of the sheet, a first approval column 48 is located, while at the lower left, a second approval column 50 is located. Thus, depending on a document to be handled, two or more approval columns can be provided. When two or more approval columns are provided, an approval status table as shown in FIG. 4A is provided for each document (a received piece of electronic mail) that requires approval. The approval status table is attached to each piece of electronic mail for transmission. The approval status table holds an approval history 41 that indicates whether approval has been made for each of approval divisions. Further, flags are set to indicate whether a first approval column 42 and a second approval column 43 have been imprinted with seals.

Figure 5A:
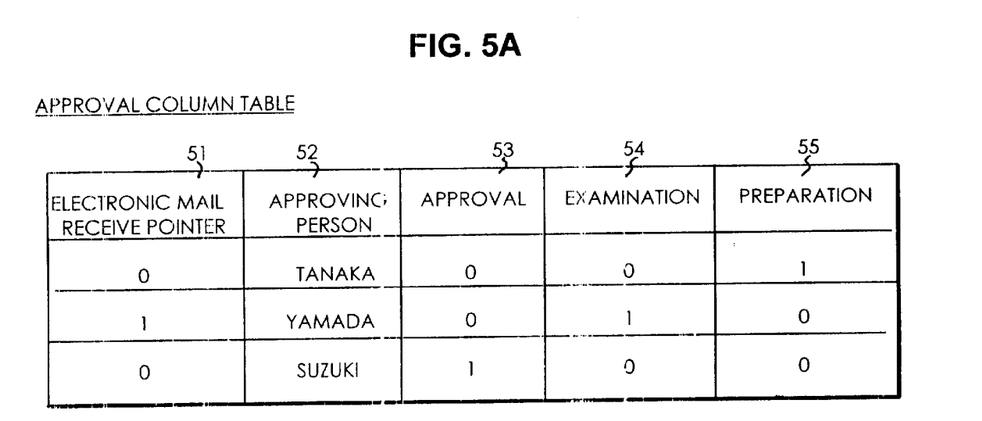
FIGS. 5A–5B illustrate an approval column table for the approving person who received the mail and an approval seal display form table for defining the method of displaying an electronic seal.
Figure 5B:
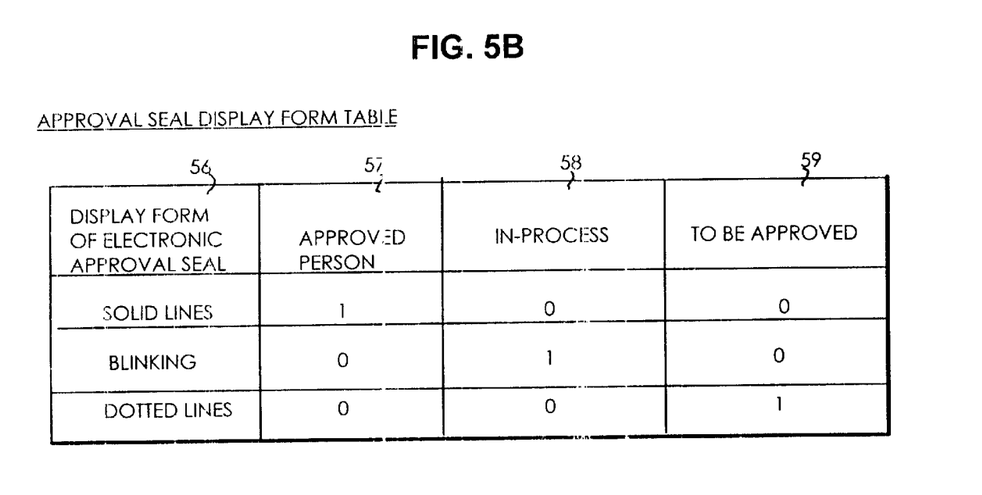

In the displayed piece of electronic mail, the imprint in each approval column to be approved in the document is caused to blink (step 26). This imprint may be the same as an electronic approval seal or may be a simple imprint in which an approving person's name is circled. Approval seals may, of course, be a signature or a stamp of the approving person. To track and recognize the information in the blinking area, each document is attached with an approval column table as shown in FIG. 5A along with the above-described approval status table shown i FIG. 4A. In this example, an approving person called Yamada with an electronic mail receive pointer being "1" is associated with the "examination" column for which the flag is set to "1". The above-described flags correspond to the images displayed in the first and second approval columns 48 and 50 of the piece of electronic mail. When the imprint is made to blink, the electronic imprint of Yamada expected to make approval and all contents 46 to be approved in the insurance money payment examination sheet is made to blink as shown in FIG. 4B. At this moment, the imprints of the first and second approval columns are displayed in manners different from each other. Namely, the imprints which may be in the form of an approved seal, an in-process seal (approval is being made), and a seal to be approved are displayed in different from each other manners. For this purpose, an approval seal display form table as shown in FIG. 5B is stored in the electronic approval seal storage device 10 in advance. In the approval seal display form table, a flag being set to "1" indicates the form of display. In the example of FIG. 5B, the approved seal is displayed in solid lines, the in-process seal is blinked, and the seal to be approved is displayed in dotted lines.

The information contained in the approval status table illustrated in FIG. 4A is displayed on the display device 7 (step 27). In this table, in the division Preparation a flag is set to "1" for the approval history 41 and flags are set to "1" for both the first and second approval columns 42 and 43. Both the approval columns 42 and 43 having flags set to "1" indicates that an approving person called Tanaka in both the first and second approval columns 48 and 50 in the insurance money payment examination sheet 47 of FIG. 4B is formally registered with a formal electronic seal prepared by the system in advance. Conversely, if the flag is set to "0," it indicates that the operator uses an approval seal prepared in graphic etc. When registered, the electronic approval seal is shown in solid lines as shown in FIG. 4B.

Figure 6A:
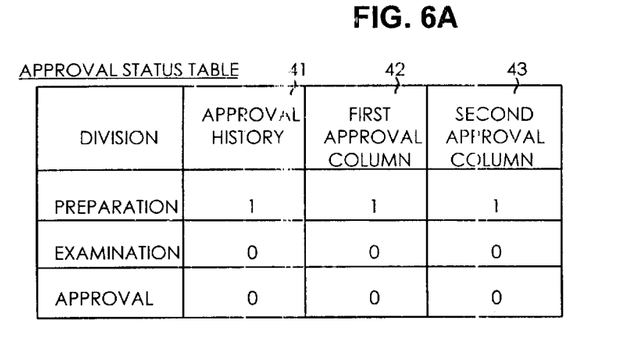
FIGS. 6A–6B illustrate an approval status table including the approval history with no approval made and a display screen.
Figure 6B:
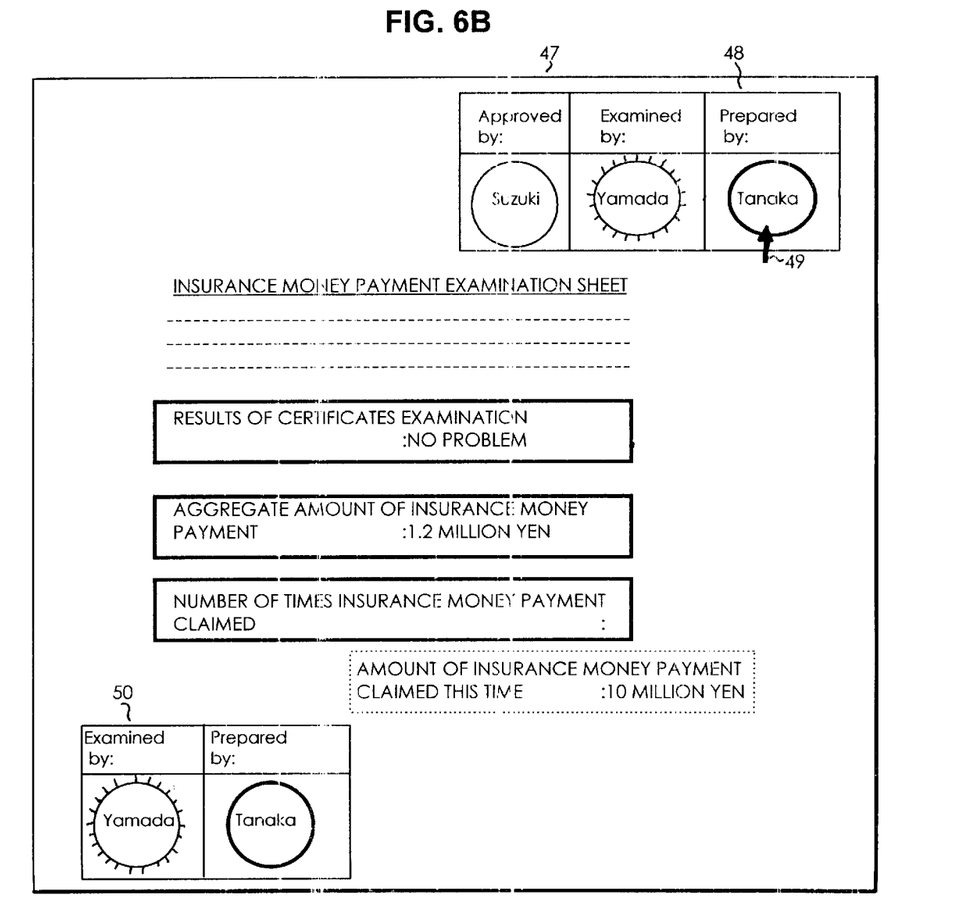

The flag of the approval status table being set to "1" indicates that the registration has been made by the approving person. The flag being set to "0" indicates that the registration has been made by a person other than the approving person. Now, the operator checks the flags of the approval history and the approval columns to determine whether the approval can be registered or not (step 28). If the operator does not approve the contents of the mail, the operator returns the mail to its sender (step 29). In returning the mail the operator clicks with a pointer 49 the approval column 48 or 50 of the sender Tanaka as shown in FIG. 6B. When the approval column of Tanaka is clicked, a pop-up menu displays a message that asks the operator whether it is OK to return the mail to Tanaka. If the operator answers OK, the mail is returned to its sender Tanaka. Thus, this electronic mail is sent back to its sender with the flag for the division examination of the approval history being left to "0" as shown in FIG. 6A.

In step 28, if the location of the approval seal has been confirmed by blinking and the approval history is also valid, then the electronic mail is approved for registration (step 30). To make registration, the operator clicks with the pointer 49 of FIG. 4B the electronic approval column of the operator. When the approval column is clicked, the flags for the approval history of the division examination and for the first or second approval columns 42 or 43 change to "1." Also an approval seal is disposed in the approval column that has been clicked. The approval seal can be disposed by changing the imprint from a blinking image to a solid image.

After the approval has been registered, the operator determines whether there is still an electronic approval seal that is blinking, namely, an approval to be made (step 31). If there is still an approval to be made, the operator moves the pointer to it to perform the operation of step 26. If all the approvals to be made by that operator have been made, the operator forwards that mail to a approving person sender (step 32).

Figure 7A:
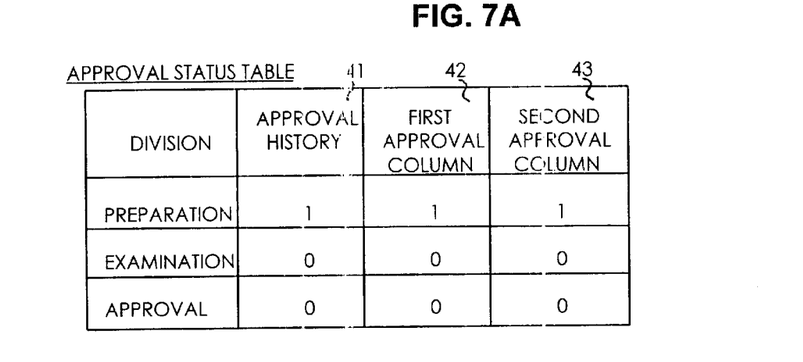
FIGS. 7A–7B illustrate an approval status table including the approval history after being approved and a display screen.
Figure 7B:
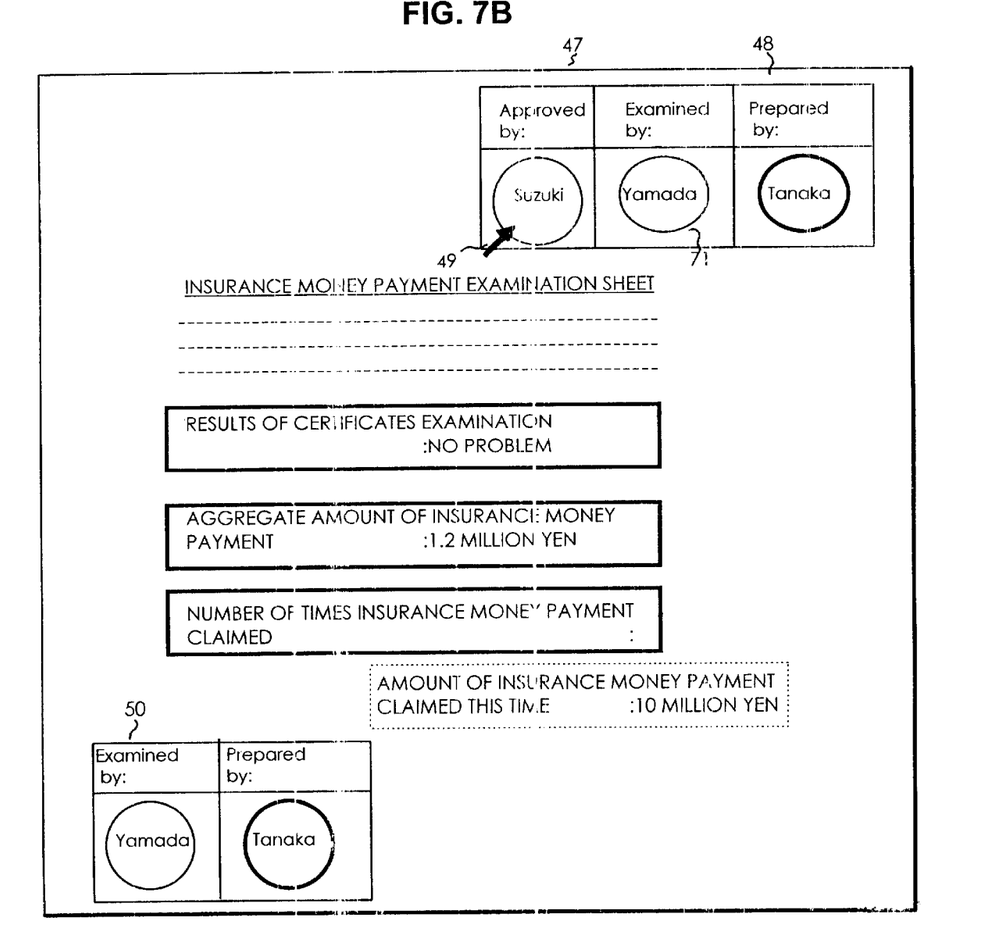

To forward the electronic mail to a next approving person, the operator clicks with the pointer 49 the approval column of the next approving person called Suzuki in the first approval column 48 as shown in FIG. 7B. In this case, since Yamada has already made approval, an electric approval seal 71 of Yamada's first approval column 48 has already been changed from blinking to solid lines. Likewise, the electronic approval seal of the second approval column is displayed in solid lines.

The above-described embodiment of the invention has been described by taking the electronic approval of an insurance money payment examination sheet for example. It will be apparent for those skilled in the art that this invention can also be applied to the processing of documents such as in-house proposals and applications in the same manner.

As described hereinbefore, according to the present invention, a piece of electronic mail to be approved can easily be selected from those received, efficiently performing electronic approval. In operation, the electronic approval column in the displayed piece of electronic mail is imprinted with the electronic approval seal of the previous approving person of the mail. In the approval column of the current approving person who received the mail, a mark is displayed in a blinking manner at the position at which the approving seal of the current approving person is to be imprinted, thus, clearly indicating the position the approving seal is to be placed for approval. The current approving person checks the contents of the received electronic mail and, if the current approving person does not approve the mail, clicks the electronic approval column of the previous approving person to return the mail back to its sender, thus, facilitating mail send-back processing. Further, if the current approving person approves the mail, the current approving person registers the electronic approval seal of the current approving person and clicks the imprint of the next approving person (a superior, another section or the like) to forward the mail, thus, facilitating mail forwarding processing.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. An electronic approval method for an electronic approval system for performing electronic approval processing on received pieces of electronic mail and transferring processed pieces of electronic mail, said electronic approval method comprising the steps of:

displaying a piece of electronic mail to be approved from said received pieces of electronic mail;

displaying in a first manner on the displayed piece of electronic mail a previous imprint of a previous approving person who previously approved said displayed piece of electronic mail by affixing an approval seal at a location of said previous imprint;

displaying in a second manner different from said first manner on said displayed piece of electronic mail a current imprint at a location where a current approving person who received said displayed piece of electronic mail is to affix an approval seal;

displaying in a third manner, different from said first and second manners, on said displayed piece of electronic mail a next imprint at a location where a next approving person, who is to approve said displayed piece of electronic mail after said current approving person, is to affix an approval seal; and when the displayed piece of electronic mail has been approved by said current approving person, transferring said displayed piece of electronic mail to said next approving person when said next approving person has been selected.

2. An electronic approval method according to claim 1 further comprising the step of:

when the displayed piece of electronic mail has not been approved by said current approving person, transferring said displayed piece of electronic mail to said previous approving person when said previous approving person has been selected.

3. An electronic approval method according to claim 1, wherein said previous imprint is displayed in a previous approval column, said current imprint is displayed in a current approval column and said next imprint is displayed in a next approval column.

4. An electronic approval method according to claim 3, wherein said first manner causes said previous imprint to be displayed using solid lines.

5. An electronic approval method according to claim 4, wherein said second manner causes said current imprint to be displayed in a blinking manner.

6. An electronic approval method according to claim 5, wherein said third manner causes said next imprint to be displayed in a dim manner.

7. An electronic approval method according to claim 1 wherein when said displayed piece of electronic mail has been approved by said current approving person, selection of said next approving person is conducted by designating said next imprint.

8. An electronic approval method according to claim 2 wherein when said displayed piece of electronic mail has not been approved by said current approving person, selection of said previous approving person is conducted by designating said previous imprint.

9. An electronic approval method according to claim 1, wherein each of said imprints contains a name of the approving person, said imprint being electronically provided to documents sent as electronic mail.

10. An electronic approval method according to claim 9, wherein said approval seal affixed to said displayed piece of electronic mail when approved contains one of a signature of an approving person or a stamp of an approving person.

11. An electronic approval method according to claim 1, wherein said current imprint is different from said approval seal to be affixed when said displayed piece of electronic mail is approved and said approval seal contains one of a signature or a stamp of said current approving person.

12. An electronic approval method according to claim 1, wherein said next imprint is different from said approval seal to be affixed when said displayed piece of electronic mail is approved and said approval seal contains one of a signature or a stamp of said next approving person.

13. An electronic approval method according to claim 10, wherein all imprints to which approval seals have not been affixed are displayed in a blinking manner.

14. An electronic approval method according to claim 10, wherein when one of said blinking imprints is selected by said approving person, the approval seal corresponding to said approving person is affixed.

15. An electronic approval method according to claim 14, wherein when one of said blinking imprints is affixed with an approval seal, a pointer moves to one of the remaining blinking imprints.

16. An electronic approval method according to claim 10, further comprising the steps of:

classifying said pieces of received electronic mail into different categories including mail for approval, mail for return/forwarding, mail for reference and unread/already read mail beforehand; and displaying the number of pieces of electronic mail falling in each of said categories;

wherein said displaying a piece of electronic mail step includes the steps of:

displaying a list of the pieces of electronic mail in a category when the category has been selected, and displaying a piece of electronic mail from said list when said piece of electronic mail has been selected.

17. An electronic approval system for electronically approving received pieces of electronic mail and transmitting the approved pieces of electronic mail, said electronic approval system comprising:

a display device for displaying a received piece of electronic mail;

an imprint display controller for displaying an approved imprint and a plurality of imprint to be approved on said displayed piece of electronic mail;

approval seal affixing apparatus for selecting an imprint to be approved and electronically affixing an approval seal to the selected imprint; and a transmitter for selecting one of the displayed imprints and transmitting the displayed piece of electronic mail to a person corresponding to the selected imprint.

18. An electronic approval system according to claim 17, wherein said approved imprint and each of said imprints to be approved are displayed in separate approval columns on said displayed piece of electronic mail.

19. An electronic approval system according to claim 17, wherein said approval seal affixing apparatus selects an imprint by designating said imprint with a cursor.

20. An electronic approval system according to claim 17, wherein said transmitter selects an imprint by designating said imprint using a cursor.

21. A computer program stored on a computer readable medium executable by a computer for performing electronic approval processing on received pieces of electronic mail and transferring processed pieces of electronic mail, said computer program comprising:

a first code for causing said computer to display a piece of electronic mail to be approved from said received pieces of electronic mail;

a second code for causing said computer to display in a first manner on the displayed piece of electronic mail a previous imprint of a previous approving person who previously approved said displayed piece of electronic mail by affixing an approval seal at a location of said previous imprint;

a third code for causing said computer to display in a second manner different from said first manner on said displayed piece of electronic mail a current imprint at a location where a current approving person who received said displayed piece of electronic mail is to affix an approval seal;

a fourth code for causing said computer to display in a third manner, different from said first and second manners, on said displayed piece of electronic mail a next imprint at a location where a next approving person, who is to approve said displayed piece of electronic mail after said current approving person, is to affix an approval seal; and a fifth code for causing said computer to transfer, when the displayed piece of electronic mail has been approved by said current approving person, said displayed piece of electronic mail to said next approving person when said next approving person has been selected.

22. A computer program according to claim 21, further comprising:

a sixth code for causing said computer to transfer, when the displayed piece of electronic mail has not been approved by said current approving person, said displayed piece of electronic mail to said previous approving person when said previous approving person has been selected.

23. A computer program according to claim 21, wherein said previous imprint is displayed in a previous approval column, said current imprint is displayed in a current approval column and said next imprint is displayed in a next approval column.

24. A computer program according to claim 23, wherein said first manner causes said previous imprint to be displayed using solid lines.

25. A computer program according to claim 24, wherein said second manner causes said current imprint to be displayed in a blinking manner.

26. A computer program according to claim 25, wherein said third manner causes said next imprint to be displayed in a dim manner.

27. A computer program according to claim 21, wherein when said displayed piece of electronic mail has been approved by said current approving person, selection of said next approving person is conducted by designating said next imprint.

28. A computer program according to claim 22, wherein when said displayed piece of electronic mail has not been approved by said current approving person, selection of said previous approving person is conducted by designating said previous imprint.

29. A computer program according to claim 21, wherein each of said imprints contains a name of the approving person, said imprint being electronically provided to documents sent as electronic mail.

30. A computer program according to claim 29, wherein said approval seal affixed to said displayed piece of electronic mail when approved contains one of a signature of an approving person or a stamp of an approving person.

31. A computer program according to claim 21, wherein said current imprint is different from said approval seal to be affixed when said displayed piece of electronic mail is approved and aid approval seal contains one of a signature or a stamp of said current approving person.

32. A computer program according to claim 21, wherein said next imprint is different from said approval seal to be affixed when said displayed piece of electronic mail is approved and said approval seal contains one of a signature or a stamp of said next approving person.

33. A computer program according to claim 30, wherein all imprints to which approval seals have not been affixed are displayed in a blinking manner.

34. A computer program according to claim 30, wherein when one of said blinking imprints is selected by said approving person, the approval seal corresponding to said approving person is affixed.

35. A computer program according to claim 34, wherein when one of said blinking imprints is affixed with an approval seal, a pointer moves to one of the remaining blinking imprints.

36. A computer program according to claim 30, further comprising:

a sixth code for causing said computer to classify said pieces of received electronic mail into different categories including mail for approval, mail for return/forwarding, mail for reference and unread/already read mail beforehand; and a seventh code for causing said computer to display the number of pieces of electronic mail falling in each of said categories;

wherein said first code comprises:
  a eight code for causing said computer to display a list of the pieces of electronic mail in a category when the category has been selected, and
  a ninth code for causing said computer to display a piece of electronic mail from said list when said piece of electronic mail has been selected.

37. An electronic approval apparatus for performing electronic approval processing on received pieces of electronic mail and transferring processed pieces of electronic mail, said electronic approval apparatus comprising:

a display having a display screen for displaying display information including a piece of electronic mail to be approved from said received pieces of electronic mail; and a controller for displaying on said display screen, in a first manner on the displayed piece of electronic mail a previous imprint of a previous approving person who previously approved said displayed piece of electronic mail by affixing an approval seal at a location of said previous imprint, displaying, on said display screen, in a second manner different from said first manner on said displayed piece of electronic mail a current imprint at a location where a current approving person who received said displayed piece of electronic mail is to affix an approval seal, displaying, on said display screen, in a third manner, different from said first and second manners, on said displayed piece of electronic mail a next imprint at a location where a next approving person, who is to approve said displayed piece of electronic mail after said current approving person, is to affix an approval seal, and when the displayed piece of electronic mail has been approved by said current approving person, transferring said displayed piece of electronic mail to said next approving person when said next approving person has been selected.

38. An electronic approval apparatus according to claim 37, wherein said controller when the displayed piece of electronic mail has not been approved by said current approving person, transfers said displayed piece of electronic mail to said previous approving person when said previous approving person has been selected.

39. An electronic approval apparatus according to claim 37, wherein said previous imprint is displayed in a previous approval column, said current imprint is displayed in a current approval column and said next imprint is displayed in a next approval column.

40. An electronic approval apparatus according to claim 39, wherein said first manner causes said previous imprint to be displayed using solid lines.

41. An electronic approval apparatus according to claim 40, wherein said second manner causes said current imprint to be displayed in a blinking manner.

42. An electronic approval apparatus according to claim 41, wherein said third manner causes said next imprint to be displayed in a dim manner.

43. An electronic approval apparatus according to claim 37, wherein when said displayed piece of electronic mail has been approved by said current approving person, selection of said next approving person is conducted by designating said next imprint.

44. An electronic approval apparatus according to claim 38, wherein when said displayed piece of electronic mail has not been approved by said current approving person, selection of said previous approving person is conducted by designating said previous imprint.

45. An electronic approval apparatus according to claim 37, wherein each of said imprints contains a name of the approving person, said imprint being electronically provided to documents sent as electronic mail.

46. An electronic approval apparatus according to claim 45, wherein said approval seal affixed to said displayed piece of electronic mail when approved contains one of a signature of an approving person or a stamp of an approving person.

47. An electronic approval apparatus according to claim 37, wherein said current imprint is different from said approval seal to be affixed when said displayed piece of electronic mail is approved and aid approval seal contains one of a signature or a stamp of said current approving person.

48. An electronic approval apparatus according to claim 37, wherein said next imprint is different from said approval seal to be affixed when said displayed piece of electronic mail is approved and said approval seal contains one of a signature or a stamp of said next approving person.

49. An electronic approval apparatus according to claim 46, wherein all imprints to which approval seals have not been affixed are displayed in a blinking manner.

50. An electronic approval apparatus according to claim 46, wherein when one of said blinking imprints is selected by said approving person, the approval seal corresponding to said approving person is affixed.

51. An electronic approval apparatus according to claim 50, wherein when one of said blinking imprints is affixed with an approval seal, a pointer moves to one of the remaining blinking imprints.

52. An electronic approval apparatus according to claim 46, wherein said controller classifies said pieces of received electronic mail into different categories including mail for approval, mail for return/forwarding, mail for reference and unread/already read mail beforehand, displays, on said display screen, the number of pieces of electronic mail falling in each of said categories, displays, on said display screen, a list of the pieces of electronic mail in a category when the category has been selected, and displays, on said display screen, a piece of electronic mail from said list when said piece of electronic mail has been selected.

* * * * *